No. 683,124. Patented Sept. 24, 1901.
H. O. LANGE.
ELEVATING STAIRWAY.
(Application filed June 2, 1899.)
(No Model.) 5 Sheets—Sheet 1.
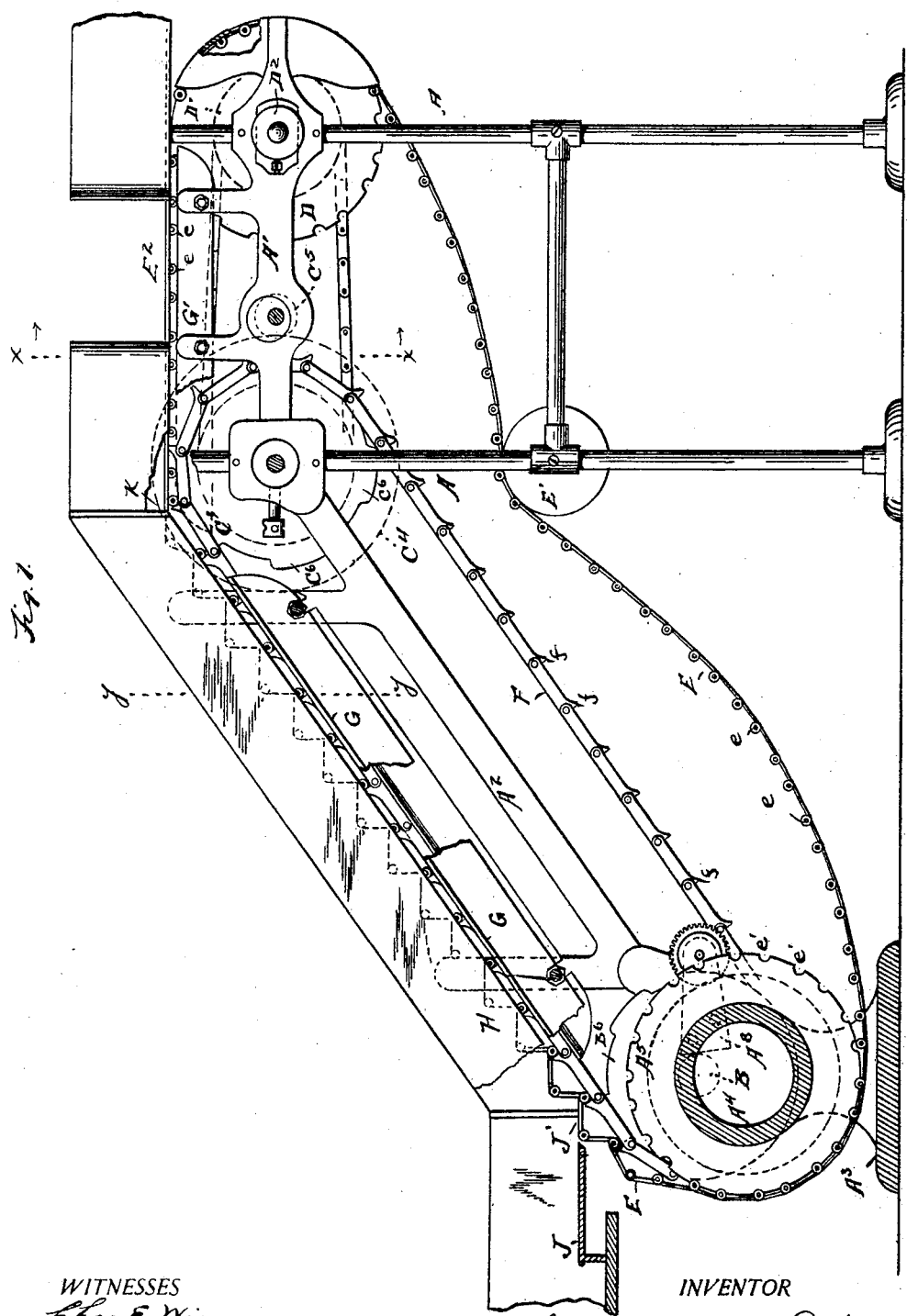
WITNESSES
INVENTOR
By Attorneys.

No. 683,124. Patented Sept. 24, 1901.
H. O. LANGE.
ELEVATING STAIRWAY.
(Application filed June 2, 1899.)
(No Model.) 5 Sheets—Sheet 2.
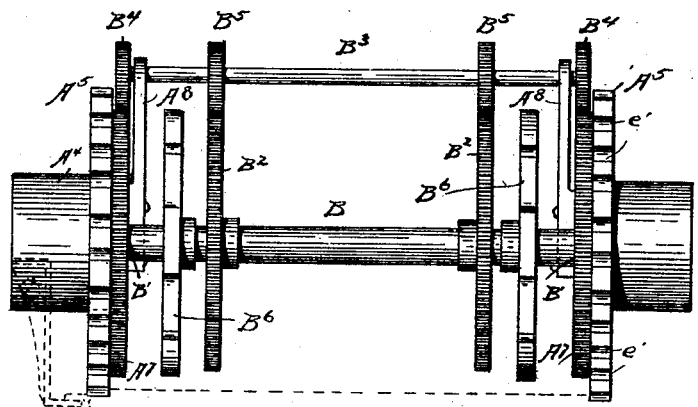
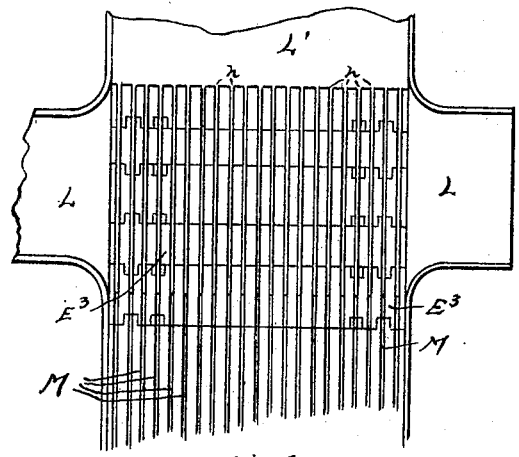
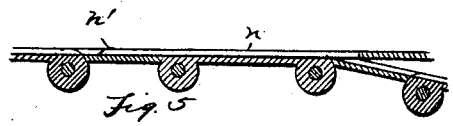
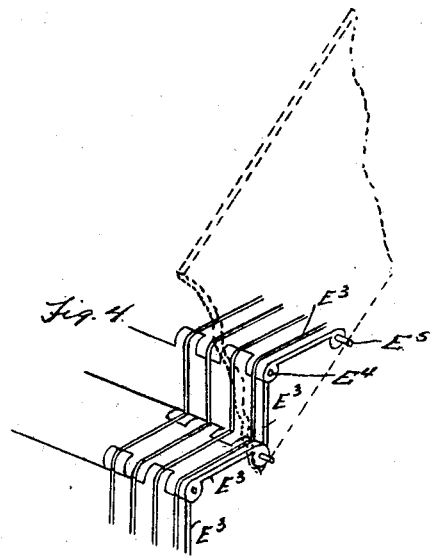
WITNESSES
Chas. E. Wiener
Marion A. Reeves
INVENTOR
Herman O. Lange
By Parker Burton
Attorneys.
THE NORRIS PETERS CO., PHOTO-LITHO., WASHINGTON, D. C.

No. 683,124. Patented Sept. 24, 1901.
H. O. LANGE.
ELEVATING STAIRWAY.
(Application filed June 2, 1899.)
(No Model.) 5 Sheets—Sheet 3.
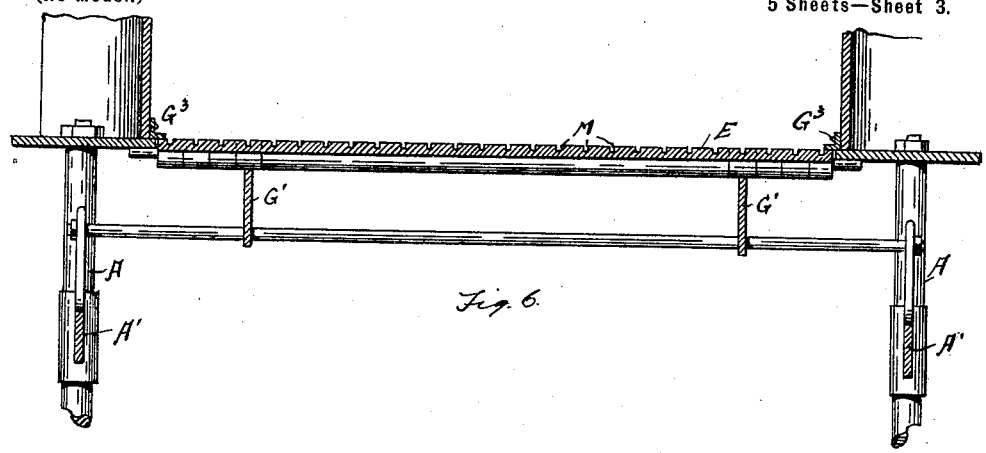
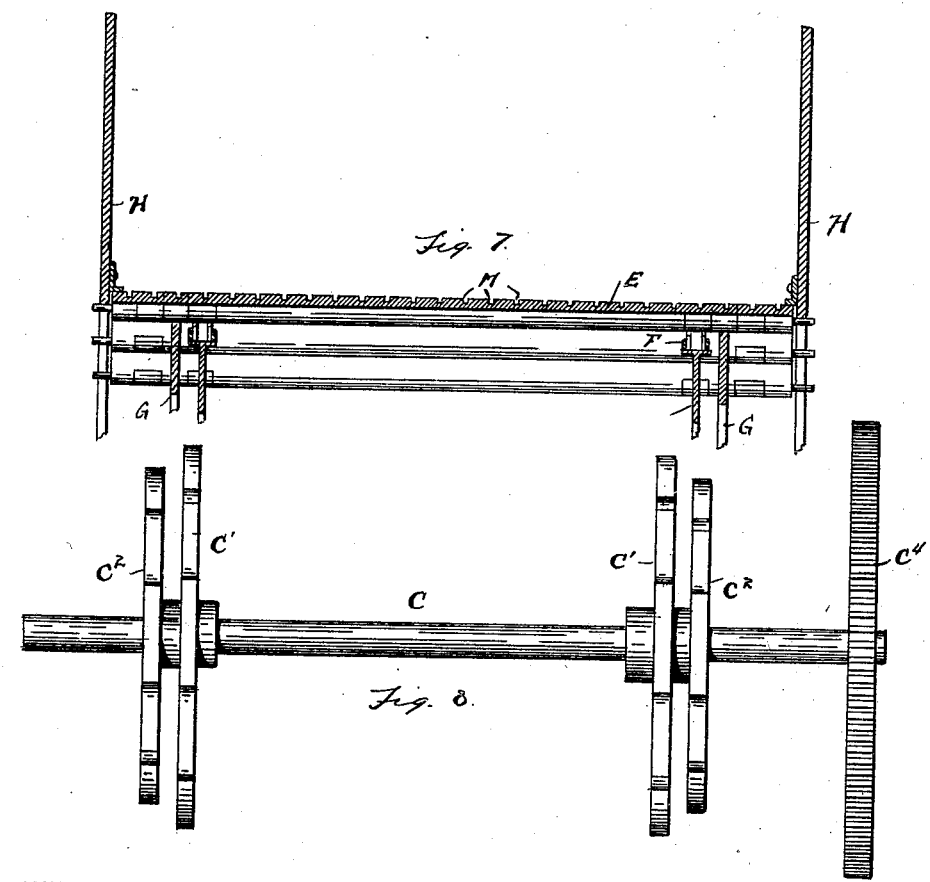

No. 683,124. Patented Sept. 24, 1901.
H. O. LANGE.
ELEVATING STAIRWAY.
(Application filed June 2, 1899.)
(No Model.) 5 Sheets—Sheet 4.
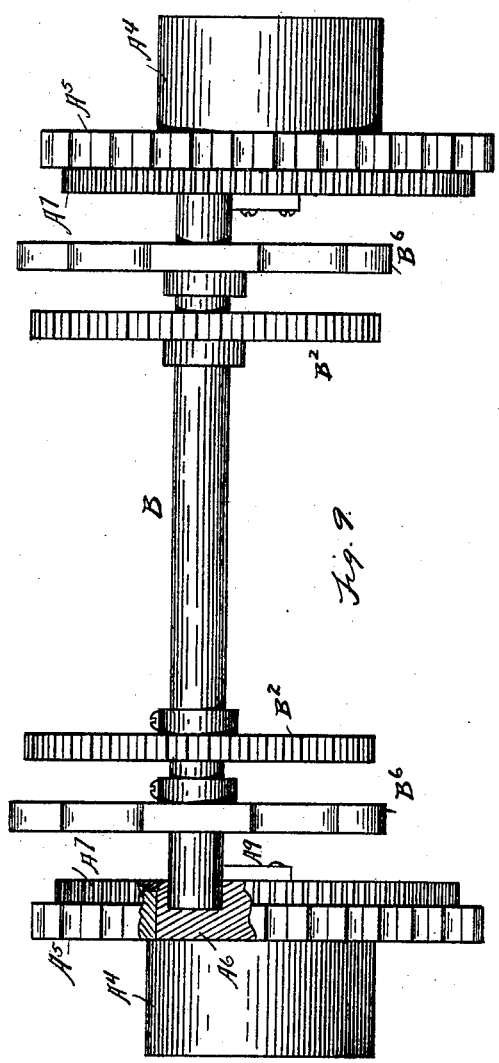
WITNESSES
INVENTOR
By
Attorneys.

No. 683,124. Patented Sept. 24, 1901.
H. O. LANGE.
ELEVATING STAIRWAY.
(Application filed June 2, 1899.)
(No Model.) 5 Sheets—Sheet 5.
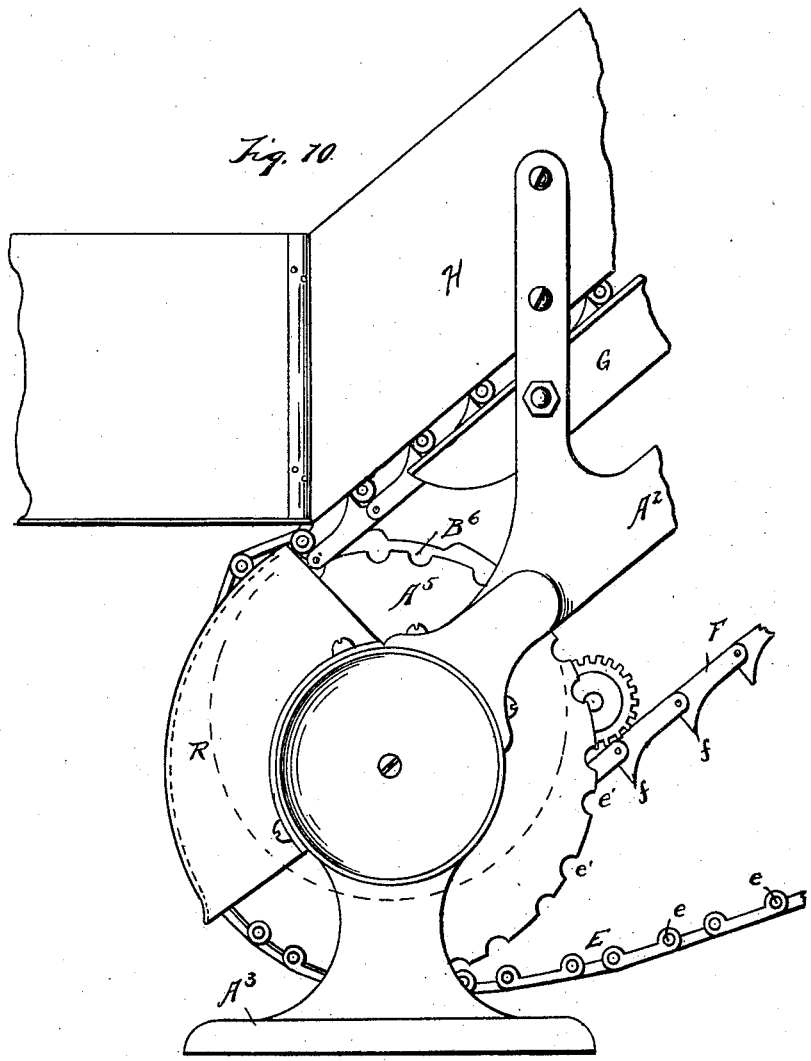
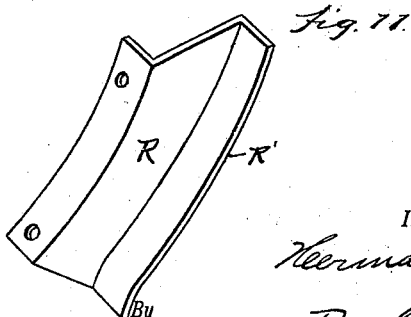
WITNESSES
Chas. E. Wisner
May E. Stott
INVENTOR
Herman O. Lange
By Parker & Burton
Attorneys.

UNITED STATES PATENT OFFICE.

HERMAN O. LANGE, OF MUSKEGON, MICHIGAN.

ELEVATING-STAIRWAY.

SPECIFICATION forming part of Letters Patent No. 683,124, dated September 24, 1901.

Application filed June 2, 1899. Serial No. 719,082. (No model.)

*To all whom it may concern:*

Be it known that I, HERMAN O. LANGE, a citizen of the United States, residing at Muskegon, county of Muskegon, State of Michigan, have invented a certain new and useful Improvement in Elevating-Stairways; and I declare the following to be a full, clear, and exact description of the invention, such as will enable others skilled in the art to which it pertains to make and use the same, reference being had to the accompanying drawings, which form a part of this specification.

My invention relates to mechanically-elevating stairways; and it consists in the arrangements and combinations hereinafter specified and claimed.

In the drawings, Figure 1 is an elevation with certain portions broken away to show the internal construction clearly. Fig. 2 is a plan view of the gearing which carries the movable staircase and which transfers the endless belt into a stairway in the manner hereinafter described at the left of Fig. 1. Figs. 3, 4, and 5 represent certain details hereinafter explained. Fig. 6 is a sectional view on line $x\,x$ of Fig. 1. Fig. 7 is a sectional view on line $y\,y$ of Fig. 1. Fig. 8 is a vertical view from the left-hand side of the carrying-wheels and sprocket-wheels which carry the top of the staircase, this gearing being detached from the staircase and framework. Fig. 9 is a corresponding left-hand vertical view or elevation of the gearing at the extreme left of Fig. 1, the same being detached from the framework, and with the traveling staircase and platforms removed for the purpose of illustrating more clearly the gearing itself. Fig. 10 is a side elevation of a portion of the mechanism at the left-hand end and the foot of the stairway, showing the casing-guide which holds the endless band in position just prior to being crimped. Fig. 11 is a detail figure of the guide detached.

In the drawings, A represents the standards of a framework located upon any suitable solid foundation.

A' is an upper member of the frame carrying details of the mechanism.

$A^2$ is a diagonal member, and it is supported at $A^3$ by a base, it being understood that the right-hand side of this frame is broken away to show the arrangement of the gearing.

It will be understood that the framework is double and that only the right-hand side is shown in Fig. 1, there being a corresponding framework upon the opposite side to support the structure.

The base $A^3$ has a large hub or bearing $A^4$, as shown in a plan view in Fig. 2 and in the elevation of Fig. 9. About this hub rotates the stop-wheel $A^5$. In Fig. 9 so much is broken away as to show the bearing for the stop-wheel and also to show upon one side the bearing for the stop-wheel and also that of a spur-wheel $A^7$, which is firmly attached to and formed integral with a stop-wheel $A^5$.

From the inner side of the hub or bearing $A^4$ projects inwardly an arm $A^8$. (Shown in dotted lines in Fig. 1, and more particularly in the plan view in Fig. 2. Only the end attached to the hub at $A^9$ is shown in Fig. 9.) This bearing $A^4$ carries an independent shaft B, which is journaled therein at B' B', it being understood that the arm $A^8$ has its duplicate $A^8$ upon the opposite side of the machine. The shaft B has rigidly attached thereto the spur-wheels $B^2$ $B^2$. The outer extremities of the arms $A^8$ $A^8$ carry by appropriate journals a secondary shaft $B^3$, and this shaft has rigidly attached to it the spur-gears $B^4$ $B^4$ and $B^5$ $B^5$. The shaft B also carries rigidly attached thereto driving sprocket-wheels $B^6$ $B^6$. These wheels being journaled on shaft B have their centers of rotation elevated above those of the stop-wheels $A^5$ $A^5$, which rotate about the hubs $A^4$ $A^4$. This is particularly shown in Fig. 9 and in dotted lines in Fig. 1. The object of this elevation of the center of rotation of sprocket-wheels $B^6$ will clearly appear subsequently.

Fig. 8 shows, as already stated, the carrying mechanism at the top of the stairway, this carrying mechanism being detached in the figure from the stairway, sprocket-chains, and framework, except so far as to show so much of the latter as will indicate the bearings. This carrying mechanism consists of a shaft C, which carries attached thereto a pair of stop-wheels C' and a pair of sprocket-wheels $C^2$ $C^2$. The stop-wheels C' and sprocket-wheels $C^2$ have not the same diameter, as will appear in the side views of these, as shown in Fig. 1. As shown in Fig. 1, there are also a pair of stop-wheels D and a pair of sprocket-wheels D' D', which correspond in diameter to those shown in Fig. 8 and which are journaled in bearings preferably adjustable, as shown at $D^2$ in Fig. 1. They therefore correspond practically to the stop and sprocket wheels and shafting shown in Fig. 8. I have shown, however, on the shaft C in Fig. 8 a spur-wheel $C^4$, which has a driving-wheel for driving the whole mechanism and to which any appropriate power may be applied, as by means of a pinion at $C^5$, Fig. 1. I have shown this pinion journaled in a cam-bearing for the purpose of throwing it in and out of gear; but this is not at all of the essence of my invention and need not, therefore, be described, as many forms of applying power to this gearing may be easily understood by those skilled in the art of applying power to machinery.

In order to form the stairway, which is continuously being elevated, I have shown a stair-band (hereinafter described) extending from the stop-wheel $A^5$ over the stop-wheels C' C' and engaging the stop-wheels D and returning to the stop-wheel $A^5$. This band is shown in elevation upon Fig. 1 at E E. On the under side it is carried by an idler-wheel E', which is appropriately journaled in the frame. This idler-wheel I need not describe in detail, it being of common construction. This endless band is of peculiar construction, and an analysis of that construction appears in Fig. 4, the top view appearing in Fig. 3 also and an "edge" view (to use the expression) appearing in Fig. 5. The view of Fig. 3 is that of the platform shown at the top of Fig. 1 in elevation at $E^2$. Fig. 4 is a view in perspective of a part of the band in the form which it takes in forming the elevating stairway. This band may be of any assignable width, as shown in plan in Fig. 3. It is composed of slotted bars of metal $E^3$ $E^3$, joined together at their edges, as shown in Fig. 4. These bars are thus transverse to the band, and, as will hereinafter appear and as more particularly shown in Fig. 1, by virtue of the joints, the band being thereby rendered flexible, the said bars are not only enabled to form themselves upon the stop-wheels, but they are adapted by virtue of the mechanism to be hereinafter described and its mode of operation to form the steps and risers continuously of the elevating-stairway, as shown partly in section and partly by dotted lines in Fig. 1. The bars $E^3$ $E^3$ are hinged together at their edges by means of transverse rods or pintles $E^4$ and $E^5$. These are arranged alternately, as shown in Fig. 4, so that the pintles $E^5$ project slightly beyond the hinged joint thus formed, whereas the pintles $E^4$ do not project. The formation of the joint is such at the inner side of the band that when it is in the position assumed at $E^2$ and also when sagging under the apparatus and also in passing around the stop-wheels there is a series of transverse ridges at the edges of the bars, these ridges forming the inside of the hinged joints, as shown at e e. Corresponding depressions e' in the periphery of the stop-wheels $A^5$ $A^5$, C' C', and D D engage these transverse projections, and therefore by virtue of the spur wheel and gearing (shown in Figs. 1 and 8) properly adjusted the band e is compelled to travel in the ordinary manner of any sprocket and band. In addition to this and for the purposes hereinafter described I have devised jointed sprocket-chains F of somewhat peculiar construction. These chains engage the sprocket-wheels $B^6$ $B^6$ of Figs. 1 and 2 and the sprocket-wheels $C^2$ $C^2$ of Fig. 8, as it will be readily understood that there is a corresponding chain F of exactly the same construction upon the opposite side of the machine from that shown in Fig. 1, but which it is not necessary to show in any of the drawings. A description of one of them and its mode of operation, with the understanding that the other coöperates, is deemed sufficient for an understanding of the structure and mode of operation. The sprocket-chains F have external projections f f attached to or formed upon one end of each link, and thereby substantially corresponding to the joints of the chain. The sprocket-wheels $C^2$ $C^2$ are driven by the shaft C and carry the sprocket-chains F F thereby, due to projections upon the wheels $C^2$ $C^2$, as shown at $C^6$ in Fig. 1. It will be noted by Fig. 1 that inasmuch as the sprocket-wheel $B^6$ has its upper portion raised above that of the stop-wheel $A^5$ and, further, as the projections f f upon the sprocket-chain are so placed that the distance between them corresponds to the hypotenuse of a right angle formed by the step and riser pair of plates of which the endless band E is made up, when these projections f f engage the ridges e e of the stair-band E as the sprocket-wheel $B^6$ and the stop-wheel $A^5$ rotate in unison, this unity of rotation being effected by means of gearing $B^4$ $B^4$ $B^5$ $B^5$ upon the shaft $B^3$, as hereinbefore stated, the structure compels the formation of the staircase continuously as the band travels.

In order to hold the endless band E closely upon the wheels $A^5$, I provide a casing R over each of the pair of wheels $A^5$ and which is firmly fastened to the hub by any appropriate means. This casing has a flange R', which projects over the extensions e e on the endless band, and thereby holds the band in close engagement with the wheel $A^5$, this extension and manner of holding it in engagement virtually forming a guide, as shown in dotted lines in Fig. 2.

The pintle-pins $E^5$, extending as they do at the outer edges of the stair-band E, engage upon their upper sides a guide H, while the under side of the hinged joint rides upon the angular way G G. In the drawings the guide H, at its lower extremities, is broken away to show the formation of the angular position so made by the step and riser as the stair-band E is carried off from the stop-wheels $A^5$ $A^5$ by the chains F. It will be observed that the mechanism is located below the platform and that the stair-step at J' is already formed just before its coinciding with the platform J and that these stair-steps are kept formed out of the riser and step-bars by the sprocket-chain on which they are carried and hinged, as already stated, until the top of the flight is reached at K. Here they are allowed to resume their normal flat position by disengagement from the chain, and the stair-band E is further carried upon ways marked G', these ways of course being supported by the framework of the structure. An internal bearing $G^3$ (shown more particularly in Fig. 6) is located upon each side of the traveling platform thus formed by the straightening out of the band and which compels the band as it reaches the top of the stairway to assume that flattened position. The carrying-wheels D D are given sufficient play, so as to accommodate the advance movement caused by the change from the angular position of the step and riser bars at their flattened position, that auxiliary movement being of course equal to the difference between the hypotenuse of the right angle formed by the step and riser when in the stairway position and the sum total of the two sides of the triangle of which the step and riser are representatives. The upper and flattened portion of the stair-band therefore forms a traveling platform, which is inserted in two fixed platforms L L, as shown by the plan view in Fig. 3. A continuation of this platform is shown at L', which may be of any assignable extent, and from this continuation there project fingers n n, the tops of which are flush with the top of the bars composing the staircase-band, and in order to accommodate them narrow grooves M M are cut transversely in the upper or outer surfaces of the bars forming the staircase-band, but longitudinally with the staircase. Therefore the groove receives the fingers as the staircase-band moves along, and the fingers thus assist in preventing any accidents by the jamming of footwear at the junction of the movable platform and the fixed platform L'. A partial sectional view of this is shown in Fig. 5, in which the extreme ends n' of these fingers n n are shown chamfered off. The grooves M M are also plainly shown in Figs. 6 and 7.

The mode of operation of this device will be understood from the preceding description. It is sufficient to say that power being applied at the point indicated, the stair-band is driven at any assignable rate of speed, and the mechanism at the lower left-hand portion of Fig. 1 and more particularly shown in Figs. 2 and 9 lifts off the band from the stop-wheels which carry it and at the same time compels it to assume the staircase form just prior to its reaching the platform upon which people are supposed to be located. As the staircase rises they step upon each step as thus formed and are carried up to the platform at the top near the stair-band, where the traveling band becomes a mere traveling platform, from whence they can emerge upon either side or at the end, as they may desire.

What I claim is—

1. In a traveling staircase, the combination of step and riser cross-strips pivoted at their edges and forming an endless band forming a movable platform, the step and riser cross-strips being properly proportioned and having grooves therein which form continuous grooves parallel with the edges of the band, and fingers projecting from a fixed platform toward which the movable platform travels, adapted to enter the grooves and form protective guides, substantially as described.

2. The combination of an endless band formed of rigid plates pivoted at their edges, each alternate pivot carrying extended guides and suitable external guides for holding the band in place while formed as a stairway, substantially as described.

3. The combination of a driving mechanism, stop-wheels adapted to carry an endless band formed of transverse rigid plates pivoted at their edges, means for lifting the band from engagement with the lower stop-wheel, and means, as an endless chain with suitable stops thereon, driven by appropriate mechanism, to engage projections in the band simultaneously with said lifting, and compel the uprising portion of said band to assume a staircase form, substantially as described.

4. The combination of an endless band formed of rigid plates pivoted at their edges so arranged that one section thereof travels above the opposite section and adapted to be crimped at one portion of its travel and uncrimped at another portion of its travel, means substantially as described for crimping said band, and guides for holding the band in place while being crimped, substantially as described.

5. In a traveling stairway, the combination of an endless band formed of horizontal strips hinged at their edges with projections at the hinged portions; carrying-wheels having properly-spaced notches in their periphery on which said band is adapted to travel; means for holding said band firmly upon said carrying-wheels, endless chains made of rigid links hinged at their extremities and carrying at a point opposite the hinges properly-spaced projections to engage the alternate hinge projections in the band; sprocket-wheels to carry said chain, the sprocket-wheels at the bottom of the ways being arranged above the carrying-wheels for the band in such manner that the chain is brought into engagement with the band as it travels, and, by means of the chain and suitable guides, transformed into a stairway; and means at the top of said inclined ways, whereby said chain is detached from the band and the band allowed to assume the position of a traveling platform, substantially as described.

6. The combination of a driving mechanism, an endless band formed of transverse pivoted plates, at their edges, pairs of carrying-wheels adapted to carry said band, means for disengaging the band from one pair of carrying-wheels and transferring it to a carrying-chain, and means to compel the portion of the band in the process of disengagement to assume a staircase form, substantially as described.

7. A movable stairway, consisting of a continuous set of treads and risers adapted to travel upward in an inclined way at right angles to each other, said treads and risers being pivotally connected and adapted to assume a position in the same horizontal plane on reaching an upper landing, the said risers being so arranged that they may oscillate upon said treads when the treads and risers are turned in a horizontal plane, substantially as described.

8. The combination of an endless band made up of jointed links and traveling over a pair of wheels, said wheels, a sprocket-chain, means upon the sprocket-chain to engage the band whereby the sprocket-chain catches each alternate joint of the band, a pair of sprocket-wheels encircled by said sprocket-chain, means whereby said band, its carrying-wheels, and said sprocket-wheels are simultaneously driven, one pair of band-wheels and one pair of sprocket-wheels being arranged in such relation that the sprocket-chain releases the band from band-wheels and transfers the carrying of the band to the sprocket-chain and simultaneously shortens the travel whereby the band is crimped upon its joints, and guides for controlling its movement, substantially as described.

9. The combination of an endless band composed of joints, each hinged to the other, carrying-wheels therefor, a sprocket-chain located in proximity thereto and adapted to engage predetermined joints of the band, one pair of sprocket-wheels carrying said chain having its center of movement eccentric to one pair of the wheels carrying the band, and means whereby the sprocket-wheels are compelled to rotate in unison with the band-wheels, the parts being so arranged that the sprocket-chain lifts the band from the band-wheels and simultaneously shortens its travel whereby the band is crimped, substantially as described.

10. The combination of an articulated endless band, band-wheels having horizontal axes for supporting and carrying the same, so that one portion of said band is vertically above the other portion, means for holding the band in engagement with the band-wheels, a sprocket-chain adapted to engage at predetermined intervals with said band and support the same, means on said band at predetermined intervals to engage said chain, means for carrying the sprocket-chain, said means having a vertical offset from the means carrying the band whereby on rotation said band is transferred vertically to the sprocket-chain and crimped, substantially as described.

11. The combination of an articulated endless band, band-wheels for carrying the same, means for supporting and holding the band in engagement with one pair of the band-wheels, a sprocket-chain adapted to engage at predetermined intervals with said band, means on said band at predetermined intervals to engage said chain, means for carrying the sprocket-chain, said means having an offset from the means carrying the band whereby on rotation said band is transferred to a plane parallel to the tangent of the band-wheels and to the sprocket-chain and crimped, means for retransferring said band from said sprocket-chain to another pair of supporting band-wheels, and means whereby said transfer is simultaneously accompanied by a transformation of said band from the crimped form to a plane form, substantially as described.

12. In an elevating-conveyer having horizontal and inclined portions, a band combined with means for causing flexure of the band for carrying sections of the load throughout the length of the inclined portions combined with means for causing flexure of the band into substantially horizontal sections, with means for causing the sections to oscillate upon each other when flexed into horizontal form and vice versa, substantially as described.

In testimony whereof I sign this specification in the presence of two witnesses.

HERMAN O. LANGE.

Witnesses:
JOHN VANDERWERP,
FRED W. FIGGE.